United States Patent [19]
Stephens et al.

[11] Patent Number: 4,812,719
[45] Date of Patent: Mar. 14, 1989

[54] HIGH VOLTAGE REGULATOR IN A TELEVISION APPARATUS

[75] Inventors: Joseph C. Stephens; Lawrence E. Smith; Michael E. Boyer, all of Indianapolis, Ind.

[73] Assignee: Thomson Consumer Electronics, Inc., Indianapolis, Ind.

[21] Appl. No.: 183,950

[22] Filed: Apr. 20, 1988

[51] Int. Cl.$^4$ .............................................. H01J 29/70
[52] U.S. Cl. ................................... 315/411; 358/190; 358/243
[58] Field of Search ................ 315/408, 411; 358/190, 358/243

[56] References Cited
U.S. PATENT DOCUMENTS 4,163,926  8/1979  Willis.
4,190,791  2/1980  Hicks.
4,298,829 11/1981  Luz.
4,321,514  3/1982  Thibodeau et al.

OTHER PUBLICATIONS

A schematic of a PC-B Television Receiver Chassis dated 4/83, published by General Electric, Television Product Service, Portsmonth, Va.

Primary Examiner—Theodore M. Blum
Attorney, Agent, or Firm—Paul J. Rasmussen; Joseph J. Laks; Sammy S. Henig

[57] ABSTRACT

A switch regulator includes a controllable SCR switch that is coupled in series with a filter inductor and a horizontal deflection generator, and the series combination is coupled across a source of unregulated direct voltage for providing a path for an increasing current flow in the inductor during a portion of a trace interval in which the switch is closed. Horizontal rate signals are coupled from the deflection generator to the switch via a first winding for controlling the opening of the switch. A catch diode is coupled to the filter inductor to form a path for a decreasing current flow in the first inductor during at least a portion of a retrace interval. The first winding is coupled in series with a second inductor to form an arrangement that is coupled between the unregulated voltage and the SCR switch. A current in the second inductor maintains the switch conductive during a portion of retrace that varies in accordance with a beam current for improving regulation of an ultor voltage.

12 Claims, 3 Drawing Sheets

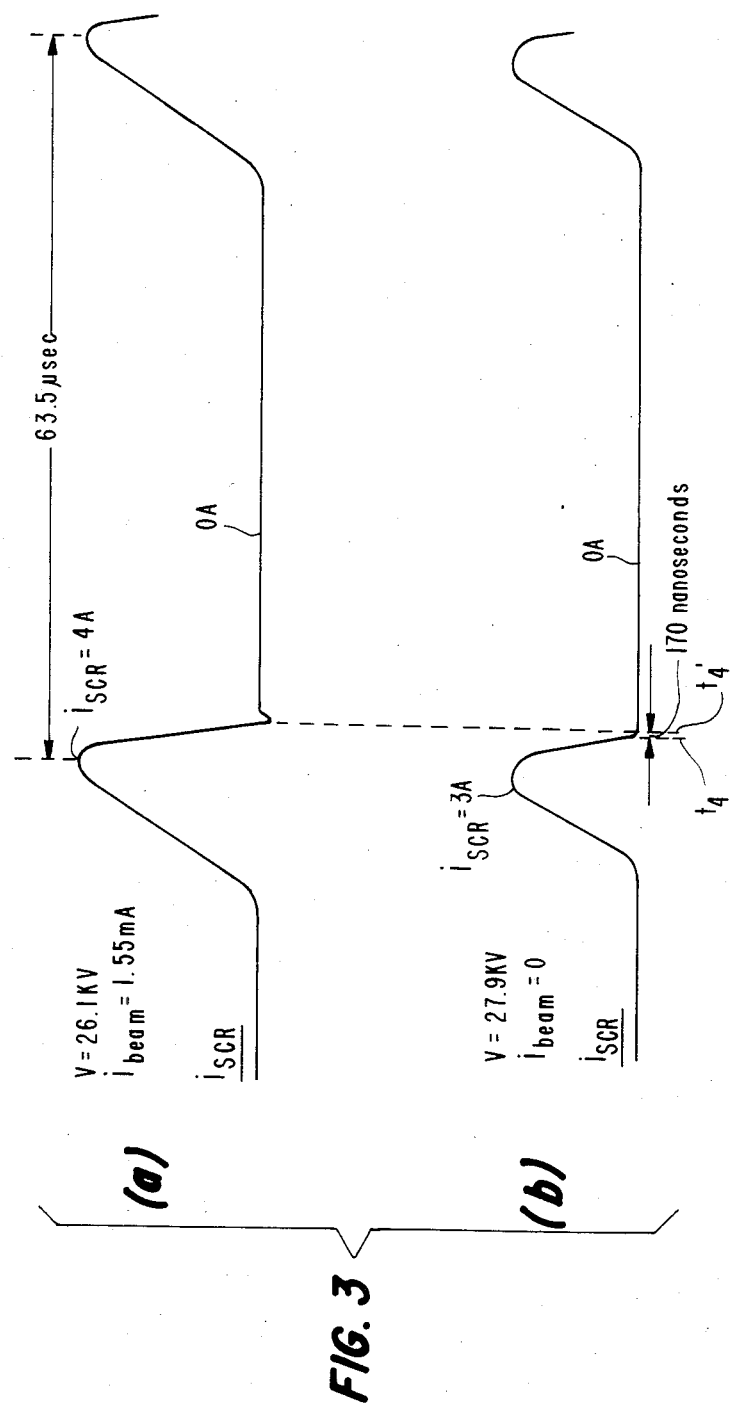

HIGH VOLTAGE REGULATOR IN A TELEVISION APPARATUS

The invention relates to a switching regulator power supply of a television apparatus operating at a frequency that is related to a deflection frequency.

A typical deflection circuit output stage that includes a retrace resonant circuit generates, in a high voltage or tertiary winding of a flyback transformer, a retrace pulse having a high peak value. The retrace resonant circuit includes a retrace capacitor. A high voltage circuit rectifies the high voltage retrace pulse in the tertiary winding for producing an ultor voltage. The output stage is energized by a B+ supply voltage that is coupled to a terminal of a primary winding of the flyback transformer. The B+ supply voltage is produced and regulated in a switching regulator.

A switching regulator, embodying an aspect of the invention, that produces the B+ supply voltage, includes a switch such as, for example, an SCR switch. When conductive, the switch couples an unregulated supply voltage to a first end terminal of a first inductor that is included in a filter. The SCR switch is conductive from an instant that is controllable, occurring within each trace interval of a horizontal deflection cycle, and remains conductive during the remaining part of trace. During retrace, the SCR switch is turned off in preparation for the following regulation cycle. Regulated B+ supply voltage is developed in a filter capacitor that is coupled to a second end terminal of the first inductor. A control circuit of the regulator varies the instant when the switch becomes conductive in a negative feedback manner such that the B+ supply voltage is maintained regulated. A turn-off winding of the flyback transformer couples a retrace pulse to the anode of the SCR switch during each horizontal retrace interval to turn off the SCR switch. A catch diode coupled to the first end terminal of the first inductor provides a current path through which current continues flowing in the first inductor after the retrace pulse, developed in the turn-off winding, occurs.

Heavy video loading will result in an increased beam current and an increased load current being drawn through the SCR switch. The increased beam current, if not compensated, may cause increased loading of the high voltage circuit that, in turn, may cause the level of the ultor voltage to decrease. Therefore, the width of each horizontal raster line may, disadvantageously, increase when the ultor voltage decreases and vice versa.

In accordance with an aspect of the invention, a second inductor is coupled in series with the turn off winding of the flyback transformer such that the SCR switch is interposed between the first and second inductors. The average current in the second inductor is directly related to the beam current. The second inductor maintains the SCR switch conductive during a portion of retrace having a duration that varies in accordance with the beam current. The duration of such interval, for example, increases when the beam current increases. Consequently, for a given value of the second inductance, the duration within retrace when energy is transferred to the retrace capacitor of the output stage, via the turn-off winding is directly related to the average current in the second inductor. As indicated before, the average current in the second inductor is directly related to the beam current. Thus, loading of the high voltage circuit, for example, caused by increased beam current is compensated by a corresponding increase in the energy that is supplied to the retrace resonant circuit via the turn-off winding during retrace. The result is that with the second inductor the ultor voltage is better regulated than without it.

In accordance with another aspect of the invention, the second inductance reduces the rate by which the current in the SCR switch decreases. Therefore, advantageously, excessive high frequency current coupling to a main supply voltage that is used for obtaining the unregulated supply voltage is reduced. Excessive high frequency current coupling may be prohibited by governmental regulation.

A power supply of a television apparatus, embodying an aspect of the invention, includes a source of a synchronizing input signal at a frequency that is related to a deflection frequency. It also includes a deflection circuit output stage responsive to the input signal, including a flyback transformer, that generates in a first winding of the transformer a first voltage. The first voltage has a retrace portion during a retrace interval and a trace portion during a trace interval in each period of the first voltage. A high voltage power supply stage coupled to the flyback transformer generates a high voltage that is applied to a first load to produce a load current. A first inductance that is separate from the flyback transformer conducts a first current having a magnitude that varies when a variation in the load current occurs. A second inductance conducts a second current therethrough that is coupled to a supply voltage receiving terminal of the deflection circuit output stage. A first switch has a main current conducting electrode that is coupled to the first winding, to the first inductance and to the input supply voltage and a control terminal that is responsive to the input signal. The first switch applies input supply voltage to the first inductance and to the second inductance during a portion of the trace interval to generate the first and second currents. The first current in the first inductance developes a voltage that is applied by the first switch to the first winding as long as the first switch is conductive, defining a first portion of the retrace interval that varies in accordance with the magnitude of first current to provide high voltage compensation. The first switch becomes nonconductive during the retrace interval for decoupling the first inductance from the first winding. A second switch coupled to the second inductance provides through the second switch a current path to the second current in the second inductance that bypasses the first switch to prevent coupling via the first switch of the second current to the first winding during at least a part of the first portions of the retrace interval.

FIGS. 2a–2d and 3a–3b illustrate waveforms useful in explaining the operation of the circuit of FIG. 1.

Figure 1:
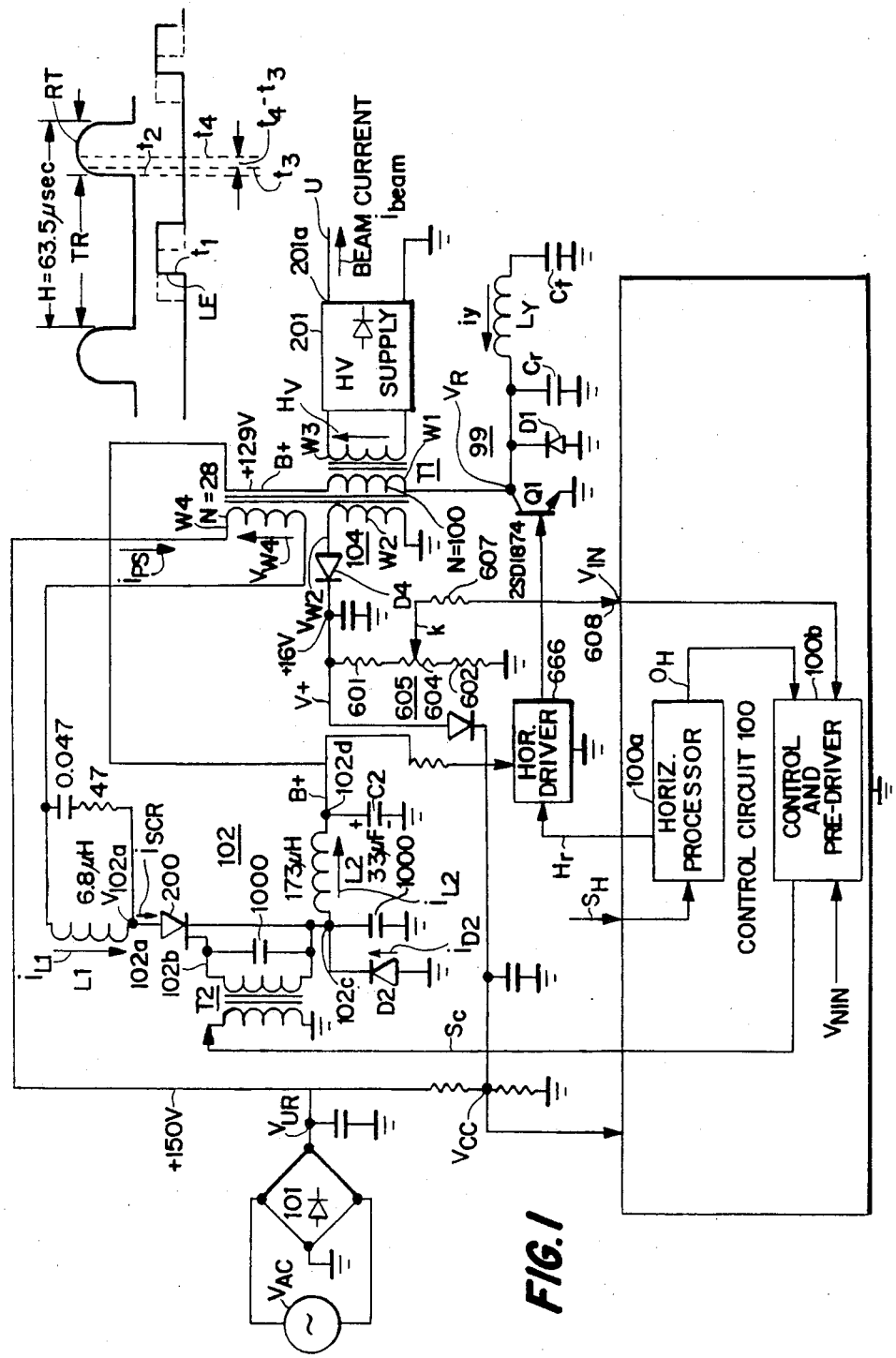
FIG. 1 illustrates a television power supply including a supply regulator embodying the invention.

FIG. 1 illustrates a portion of a television receiver incorporating a bridge rectifier 101 that rectifies a mains supply voltage $V_{AC}$ produce a DC, unregulated voltage $V_{UR}$. An output stage, or switch regulator 102, embodying an aspect of the invention, that may include a silicon controlled rectifier (SCR) switch, referred to herein as SCR 200, produces a regulated voltage B+ that is coupled to a winding W1 of a flyback transformer T1. An input terminal 102c of regulator 102 is coupled to unregulated voltage $V_{UR}$. Regulated voltage B+ is developed at an output terminal 102d of switch regulator 102. Transformer T1 is coupled to a collector electrode of a deflection switching transistor Q1 of a horizontal circuit output stage 99 operating at a horizontal rate $f_H$. A control signal $H_r$ at the horizontal rate $f_H$, that is produced in a corresponding portion of a control circuit 100, referred to herein as a horizontal processor 100a, is coupled via a horizontal driver 666 to the base electrode of transistor Q1. Signal $H_r$ controls the switching of transistor Q1 to generate a deflection current $i_y$ in a deflection winding $L_Y$ of output stage 99. A retrace voltage $V_{w2}$ is produced in a conventional manner across a winding W2 of transformer T1 in each retrace interval of each horizontal period H. A high voltage retrace pulse $H_V$ developed in a winding W3 of transformer T1 is coupled to a high voltage supply 201 that generates in a conventional manner an ultor voltage U. Each retrace interval occurs immediately after transistor Q1 becomes nonconductive. A DC, run-mode supply voltage V+, that is illustratively +16 volts, is produced by rectifying voltage $V_{w2}$ in a rectifier arrangement 104 that is coupled to winding W2. Processor 100a also generates a signal $O_H$ at the frequency $f_H$ at a constant phase relative to a horizontal sync signal $S_H$. Signal $S_H$ is produced in a conventional manner, not shown. Voltage V+ is also coupled to various circuits of the receiver, not shown, to provide them with a supply voltage.

Voltage V+ is also coupled to a corresponding portion of control circuit 100 that is referred to herein as switch mode SCR regulator control and pre-driver 100b to provide a feedback signal $V_{IN}$. Control and pre-driver 100b generates a signal $S_C$ at the rate $f_H$ and at a controllable phase that controls the instant, in each horizontal interval H, in which SCR 200 becomes conductive. The phase of signal $S_C$ varies, in accordance with a difference between voltage $V_{IN}$ that is proportional to voltage V+ and a reference voltage $V_{NIN}$ that may be produced in a conventional manner. Signal $S_C$ causes regulated voltage B+ to be at a predetermined DC voltage level such as, illustratively, +129 volts.

In accordance with a feature of the invention, the anode of SCR 200 is coupled to unregulated voltage $V_{UR}$ via a winding W4 of transformer T1 and via an inductor L1 that is coupled in series with winding W4. The cathode of SCR 200 is coupled to an end terminal 102c of a filter inductor L2. A second end terminal 102d of inductor L2, where regulated voltage B+ is developed, is coupled to winding W1 of flyback transformer T1. A filter capacitor C2 is coupled between terminal 102d and ground. Signal $S_c$ is coupled via a driver transformer T2 to the gate electrode of SCR 200.

Figure 2:
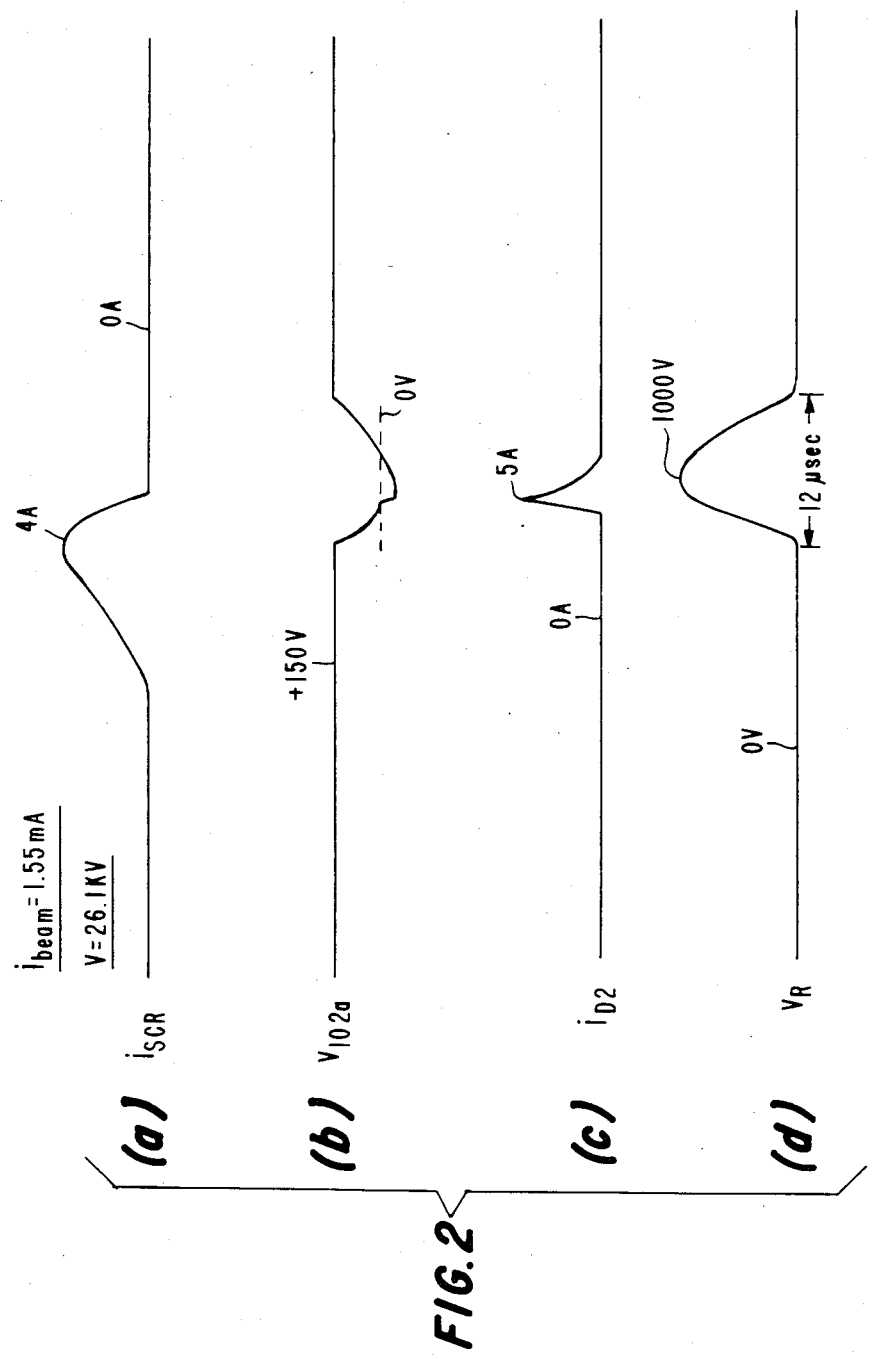

FIGS. 2a-2d and 3a-3b illustrate waveforms useful in explaining the operation of the circuit of FIG. 1. Similar numerals and symbols in FIGS. 1, 2a-2d and 3a-3b indicate similar items or functions. When a leading edge LE of signal $S_c$ of FIG. 1, having a controllable phase as shown in the waveform of FIG. 1, occurs, SCR 200 is triggered and becomes immediately conductive. Leading edge LE occurs at a time $t_1$ during a trace interval of each period H of a voltage $V_{W4}$ that is developed across winding W4. During the interval in which SCR 200 is conductive, a current $i_{L1}$ in inductor L1 and a current $i_{L2}$ in inductor L2, increase. An example of a waveform of a current $i_{SCR}$ in SCR 200 is shown in FIG. 2a. The rate of increase of currents $i_{SCR}$, $i_{L1}$ and $i_{L2}$ of FIG. 1 is determined by the portion of voltage $V_{W4}$, occurring during trace, by unregulated voltage $V_{UR}$ by regulated voltage B+. The rate of increase is also determined by the sum of the inductances of inductors L1 and L2.

At the end of horizontal trace, a time $t_2$ shown in the waveform of FIG. 1, a retrace pulse portion of voltage $V_{W4}$ is developed. Voltage $V_{w4}$ is developed from voltage $V_R$ of FIG. 2d in retrace capacitor $C_r$ of FIG. 1. The retrace pulse $V_{W4}$ in winding W4 is poled in such a manner as to tend to reverse bias SCR 200 and to reduce the corresponding currents flowing in inductors L1 and L2. As a result of the negative rate of change of current $i_{L2}$ in inductor L2, a voltage developed at terminal 102c is decreased at a fast rate. The voltage at terminal 102c decreases until a time $t_3$ of retrace pulse portion RT when a catch diode D2 that is coupled between ground terminal 102c becomes conductive. FIG. 2c illustrates an example of the waveform of a current $i_{D2}$ in diode D2 and FIG. 2b illustrates the corresponding anode voltage, voltage $V_{102a}$, of SCR 200 of FIG. 1. The operation of a diode such as catch diode D2 is described in detail in U.S. Pat. No. 4,163,926, entitled SWITCH REGULATOR FOR A TELEVISION APPARATUS, in the name of D. H. Willis, that is incorporated by reference herein.

In accordance with another feature of the invention, after catch diode D2 becomes conductive, current $i_{L1}$ continues to decrease at a rate of change that is unaffected by current $i_{L2}$ in inductor L2. As long as a sum of voltage $V_{UR}$ and a voltage that is developed across inductor L1 as a result of the negative rate of change of current $i_{L1}$ is greater than retrace voltage $V_{W4}$, SCR 200 remains conductive and a supply current $i_{PS}$ continues flowing in winding W4. As long as SCR 200 is conductive, current $i_{L1}$ develops a voltage that is applied to winding W4 and that, in turn, is magnetically coupled to winding W3. When, during retrace, SCR 200 becomes reversed biased, currents $i_{PS}$ and $i_{L1}$ cease.

For given values of voltage $V_{W4}$ and $V_{UR}$, the length of an interval, $t_4-t_3$, occurring within retrace portion RT that is shown in FIG. 1, from the time diode D2 becomes conductive up to the time SCR 200 is turned-off, is determined by the inductance of inductor L1 and by a level of current $i_{L1}$ at the end of trace. Because the level of current $i_{L1}$ is directly proportional to an average value of a beam current $i_{beam}$ that is supplied from a terminal 201a of high voltage supply 201, the length of interval $t_4-t_3$ increases when the average value of the beam current increases and decreases when the average value of the beam current decreases. FIG. 3a illustrates an example of the waveform of current $i_{SCR}$ in SCR 200 of FIG. 1 for maximum beam current and FIG. 3b for a minimum beam current. Note that in the example of FIG. 2a, current $i_{SCR}$ becomes zero at time $t_4'$ that is at a relatively later time than the corresponding time $t_4$ in FIG. 2b.

In accordance with a further feature of the invention, as long as SCR 200 of FIG. 1 is conductive, during interval $t_4-t_3$, current $i_{L1}$ of inductor L1 generates a voltage that is applied to winding W4 and, in turn, to retrace capacitor $C_r$ of horizontal output stage 99. Therefore, the charge applied via winding W4 to capacitor $C_r$ increases proportionally to the length of interval $t_4-t_3$. Therefore, the increase in the charge in retrace capacitor $C_r$ is directly proportional to the beam current and to the inductance of inductor L1. The increase in the charge of capacitor $C_r$ tends t compensate for beam current loading variations. Consequently, a tendency of ultor voltage U, for example, to decrease, as a result of increased beam current loading is, advantageously, compensated by the energy stored in inductor L1 that is applied to high voltage winding W3 via winding W4. For example, the higher is the beam current, the longer is the duration of interval $t_4-t_3$ during which the current in inductor L1 continues flowing and being applied to winding W4 after diode D2 becomes conductive. Therefore, advantageously, more energy is applied via winding W4 to capacitor $C_r$ during retrace. The result is that an output impedance at terminal 201a of high voltage supply 201 is, advantageously, reduced. Therefore, raster width variations caused by video loading variations are, advantageously, reduced.

The sum of the inductances of inductors L1 and L2 may be selected in accordance with a maximum level of the load current that is required from regulator 102 at terminal 102d of inductor L2 so as to obtain a maximum permitted ripple voltage in voltage B+. Selecting the sum of the values of inductors L1 and L2 may also be dependent on the maximum settling time of the feedback loop that includes regulator 102 and pre-driver 100b that is required.

During retrace, after catch diode D2 becomes conductive, inductor L2 is decoupled from inductor L1 by conductive diode D2. After diode D2 becomes conductive, current $i_{L2}$ in inductor L2 has no effect on the high voltage compensation. Therefore, for a given value of the sum of the inductances of inductors L1 and L2 that is selected, the value of inductor L1 may be, advantageously, selected with a high degree of freedom. Inductor L1 may be selected for obtaining beam current regulation that is better than if inductor L1 were not used. Thus, the value of each of inductors L1 and L2 may be selected to provide, advantageously, the maximum permitted ripple of voltage B+ and also beam current compensation.

In accordance with a further aspect of the invention, inductor L1 reduces the rate by which supply current $i_{PS}$, decreases during horizontal retrace. Therefore, inductor L1 advantageously, prevents generation excessive transient current at high frequency from being coupled to mains supply voltage $V_{AC}$. Prevention of coupling of excessive transient current to the mains supply source may be required by governmental regulation.

Winding W4 may include a leakage inductance that appears in series with the inductance of inductor L1.

In accordance with additional feature of the invention, by utilizing inductor L1, that is separate from transformer T1 and that is magnetically decoupled from winding W4, the total inductance between the anode of SCR 200 and the terminal of bridge rectifier 101 where voltage $V_{UR}$ is generated is increased. Such total inductance provides high voltage compensation that is superior to a situation in which the only contributor to such total inductance is the leakage inductance of winding W4. Using inductor L1 that is separate from the leakage inductance associated with winding W4 is advantageous relative to a situation in which the total inductance is obtained by the leakage inductance. For example, by using inductor L1, the windings of transformer T1 can be tightly coupled that, advantageously, simplifies the design of transformer T1. Also, by using tightly coupled windings, core saturation, that may occur as a result of DC current in winding W1, is prevented by a DC current flowing in the opposite direction in winding W4.

What is claimed is:

1. A power supply of a television apparatus, comprising:

a source of a synchronizing input signal at a frequency that is related to a deflection frequency;

a deflection circuit output stage responsive to said input signal, including a flyback transformer, for generating in a first winding of said transformer a first voltage having a retrace portion during a retrace interval and a trace portion during a trace interval in each period of said first voltage;

a high voltage power supply stage coupled to said flyback transformer for generating a high voltage that is applied to a first load to produce a load current therein;

a first inductance separate from said flyback transformer for conducting therethrough a first current having a magnitude that varies when a variation in said load current occurs;

a source of an input supply voltage;

a second inductance for conducting a second current therethrough that is coupled to a supply voltage receiving terminal of said deflection circuit output stage;

a first switch having a main current conducting electrode that is coupled to said first winding, to said first inductance and to said input supply voltage and a control terminal that is responsive to said input signal, said first switch applying said input supply voltage to said first inductance and to said second inductance during a portion of said trace interval to generate said first and second currents, said first current in said first inductance developing a voltage that is applied by said first switch to said first winding as long as said first switch is conductive, thereby defining a first portion of said retrace interval that varies in accordance with said magnitude of said first current for providing high voltage compensation, said first switch becoming nonconductive during said retrace interval for decoupling said first inductance from said first winding; and a second switch coupled to said second inductance for providing through said second switch a current path for said second current in said second inductance that bypasses said first switch to prevent coupling of said second current to said first winding via said first switch during at least a part of said first portion of said retrace interval.

2. A power supply according to claim 1 wherein said first switch comprises an SCR switch that becomes nonconductive when a sum of said first voltage, said input supply voltage and a voltage that is developed in said first inductance has a magnitude that is smaller than a predetermined value.

3. A power supply according to claim 2 wherein said second switch comprises a diode that is coupled at a junction between said second inductance and said first switch for conducting said second current in said second inductance from a time during said retrace interval that occurs prior to the time said first switch becomes nonconductive.

4. A power supply according to claim 1 wherein said first inductance, said first winding, said first switch and said second inductance are coupled in series.

5. A power supply according to claim 1 wherein said first inductance is substantially smaller than said second inductance.

6. A power supply according to claim 1 further comprising, a control circuit responsive to said input signal for generating a control signal having a timing that varies in accordance with a difference between an output supply voltage developed at said supply voltage receiving terminal and a reference voltage, said control signal being coupled to sad control terminal of said first switch for controlling when said first switch becomes conductive within said trace interval in a manner that varies the duty cycle of said first switch to regulate said output supply voltage.

7. A power supply according to claim 6 wherein said second inductance is included in a filter for generating said output supply voltage with low magnitude of a ripple such that an effect of said first inductance on said ripple is substantially smaller than that of said second inductance.

8. A power supply according to claim 1 wherein said high voltage power supply stage generates an ultor voltage that is regulated by said first current in accordance with said load current.

9. A power supply according to claim 1 wherein said first switch becomes conductive during said trace interval and becomes nonconductive during said retrace interval and said second switch becomes conductive prior to the time within said retrace interval when said first switch becomes nonconductive.

10. A power supply according to claim 1 wherein said first inductance substantially reduces a rate of change, during said retrace interval, of a current that flows from said source of said input supply voltage through said first switch.

11. A power supply according to claim 1 wherein the value of said second inductance is selected for causing said second current to become zero prior to a time during said each period when said first switch becomes conductive.

12. A power supply of a television apparatus for generating an output supply voltage, comprising:
   a source of a synchronizing input signal at a frequency that is related to a deflection frequency;
   a deflection circuit output stage responsive to said input signal including a flyback transformer for generating in a first winding of said transformer a first voltage having a retrace portion during a retrace interval and a trace portion during a trace interval in each period of said first voltage;
   a high voltage power supply stage coupled to said flyback transformer for generating an ultor voltage that varies in accordance with a beam current that is produced thereby;
   a filter for generating at an output terminal of said filter said output supply voltage that is coupled to a supply voltage receiving terminal of said deflection circuit output stage for energizing said output stage;
   a source of an unregulated input supply voltage;
   a first inductance that is separate from said flyback transformer and that is coupled to said first winding to form an arrangement that is coupled to said unregulated supply voltage;
   a controllable first switch interposed between said arrangement and said filter for coupling said input supply voltage to said filter during a portion of said trace interval to produce a current in said filter and to produce a current in said first inductance that varies in accordance with said beam current, said first switch coupling the current that flows in said first inductance to said first winding during a portion of said retrace interval so as to regulate said ultor voltage when a variation in said beam current occurs; and
   a second switch in shunt with said filter inductance and having a terminal that is coupled between said first switch and said filter for providing a current path to the current in said filter during said retrace interval that bypasses said first switch.

* * * * *